US012279122B2

(12) United States Patent
Hunt et al.

(10) Patent No.: US 12,279,122 B2

(45) Date of Patent: Apr. 15, 2025

(54) DEVICE COMMUNICATION MANAGEMENT IN USER ACTIVITY MONITORING SYSTEMS

(71) Applicant: T.J.Smith and Nephew, Limited, Hull (GB)

(72) Inventors: Allan Kenneth Frazer Grugeon Hunt, Beverley (GB); Johannes Dagevos van Rij, Skidby (GB)

(73) Assignee: T.J.Smith and Nephew,Limited, Hull (GB)

( * ) Notice: Subject to any disclaimer, the term of this patent is extended or adjusted under 35 U.S.C. 154(b) by 0 days.

(21) Appl. No.: 18/230,847

(22) Filed: Aug. 7, 2023

(65) Prior Publication Data

US 2024/0031813 A1 Jan. 25, 2024

Related U.S. Application Data

(63) Continuation of application No. 17/946,586, filed on Sep. 16, 2022, now Pat. No. 11,722,902, which is a (Continued)

(30) Foreign Application Priority Data

Jun. 4, 2018 (GB) ..................................... 1809081
Jun. 5, 2018 (GB) ..................................... 1809146

(51) Int. Cl.
*H04W 12/50* (2021.01)
*H04L 67/12* (2022.01)
(Continued)

(52) U.S. Cl.
CPC ............ *H04W 12/50* (2021.01); *H04L 67/12* (2013.01); *H04W 12/0471* (2021.01); *H04W 12/68* (2021.01); *H04W 76/14* (2018.02)

(58) Field of Classification Search
CPC . H04W 12/50; H04W 12/0471; H04W 12/68; H04W 76/14; H04W 4/70; H04W 4/80; H04L 67/12
See application file for complete search history.

(56) References Cited

U.S. PATENT DOCUMENTS 3,974,491 A 8/1976 Sipe
4,610,253 A 9/1986 Rosenberg
(Continued)

FOREIGN PATENT DOCUMENTS

CN 105631195 B 12/2017
CN 110025316 A 7/2019
(Continued)

OTHER PUBLICATIONS

Abbott Diabetes Care Ltd., "FreeStyle Libre Flash Glucose Monitoring System—User's Manual," Mar. 2014, 124 pages.
(Continued)

*Primary Examiner* — Ankur Jain
(74) *Attorney, Agent, or Firm* — Knobbe, Martens, Olson & Bear, LLP

(57) ABSTRACT

In some aspects, a method of managing communication between a first electronic device and a second electronic device. The method includes facilitating, by a first electronic device, motion of a second electronic device in a motion sequence; detecting, by the second electronic device, motion of the second electronic device in the motion sequence; determining, by the second electronic device, a key from the motion sequence from the detecting, the key being usable to communicate with the first electronic device; and wirelessly communicating, by a communication interface of the second electronic device, with the first electronic device using the key.

20 Claims, 12 Drawing Sheets

140
120
150

Related U.S. Application Data continuation of application No. 17/041,975, filed as application No. PCT/EP2019/064469 on Jun. 4, 2019, now Pat. No. 11,451,965.

(51) Int. Cl.
*H04W 12/0471* (2021.01)
*H04W 12/68* (2021.01)
*H04W 76/14* (2018.01)

(56) References Cited

U.S. PATENT DOCUMENTS 5,107,854 A 4/1992 Knotts et al.
5,253,654 A 10/1993 Thomas et al.
5,642,096 A 6/1997 Leyerer et al.
5,875,571 A 3/1999 Huang
5,879,292 A 3/1999 Sternberg et al.
6,031,463 A 2/2000 Bechmann
6,282,448 B1 8/2001 Katz et al.
6,287,253 B1 9/2001 Ortega et al.
6,571,193 B1 5/2003 Unuma et al.
7,998,092 B2 8/2011 Avni et al.
8,111,165 B2 2/2012 Ortega et al.
8,224,351 B1 7/2012 Sushkov et al.
8,280,682 B2 10/2012 Vock et al.
8,388,553 B2 3/2013 James et al.
8,753,275 B2 6/2014 Najafi et al.
8,925,392 B2 1/2015 Esposito et al.
8,947,237 B2 2/2015 Margon et al.
9,220,455 B2 12/2015 Sarrafzadeh et al.
9,427,179 B2 8/2016 Mestrovic et al.
9,439,599 B2 9/2016 Thompson et al.
9,473,491 B1 10/2016 Johansson et al.
9,629,585 B2 4/2017 Das et al.
9,861,550 B2 1/2018 Ribble et al.
9,907,103 B2 2/2018 Chen et al.
9,939,784 B1 4/2018 Berardinelli
10,019,555 B2 7/2018 Manice et al.
10,085,675 B2 10/2018 Nagasaki et al.
10,166,164 B2 1/2019 Johnson et al.
10,274,305 B2 4/2019 Huang et al.
10,307,111 B2 6/2019 Muhsin et al.
10,335,636 B2 7/2019 Holma et al.
12,114,995 B2 10/2024 Walgreen et al.
2003/0088294 A1 5/2003 Gesotti
2005/0099294 A1 5/2005 Bogner et al.
2005/0165284 A1 7/2005 Gefen
2007/0173903 A1 7/2007 Goren et al.
2007/0222746 A1 9/2007 LeVine
2008/0216593 A1 9/2008 Jacobsen et al.
2008/0287832 A1 11/2008 Collins et al.
2009/0069727 A1 3/2009 Neustaedter et al.
2009/0070939 A1 3/2009 Hann
2009/0195959 A1 8/2009 Ladouceur et al.
2009/0209830 A1 8/2009 Nagle et al.
2009/0234249 A1 9/2009 Randolph
2009/0234262 A1 9/2009 Reid, Jr. et al.
2009/0292194 A1 11/2009 Libbus et al.
2010/0056873 A1 3/2010 Allen et al.
2010/0162832 A1 7/2010 Brauers
2010/0198022 A1 8/2010 Vuillerme et al.
2010/0199092 A1 8/2010 Andrus et al.
2010/0225476 A1 9/2010 Klose
2010/0268111 A1 10/2010 Drinan et al.
2010/0269165 A1 10/2010 Chen et al.
2010/0298742 A1 11/2010 Perlman et al.
2010/0324455 A1 12/2010 Rangel et al.
2011/0054359 A1 3/2011 Sazonov et al.
2011/0130697 A1 6/2011 Nagle et al.
2011/0214501 A1 9/2011 Ross et al.
2011/0263950 A1 10/2011 Larson et al.
2011/0304577 A1 12/2011 Brown et al.
2012/0010535 A1 1/2012 Kubiak et al.
2012/0084466 A1 4/2012 Brown et al.
2012/0109013 A1 5/2012 Everett et al.
2012/0238914 A1 9/2012 Goldfield et al.
2013/0023720 A1 1/2013 Solomon et al.
2013/0057496 A1 3/2013 Hong et al.
2013/0065517 A1 3/2013 Svensson et al.
2013/0157571 A1 6/2013 Wondka et al.
2013/0167848 A1 7/2013 Frassica et al.
2013/0213145 A1 8/2013 Owings et al.
2013/0282324 A1 10/2013 Carter et al.
2013/0308506 A1 11/2013 Kim et al.
2013/0317753 A1 11/2013 Kamen et al.
2014/0089673 A1 3/2014 Luna
2014/0135657 A1 5/2014 Wu et al.
2014/0188499 A1 7/2014 Bell et al.
2014/0200486 A1 7/2014 Bechtel et al.
2014/0203797 A1 7/2014 Stivoric et al.
2014/0221787 A1 8/2014 Teller et al.
2014/0235166 A1 8/2014 Molettiere et al.
2014/0303460 A1 10/2014 Corley et al.
2014/0324591 A1 10/2014 Kim et al.
2014/0350435 A1 11/2014 Lam
2014/0378786 A1 12/2014 Hong et al.
2015/0042454 A1 2/2015 Lee
2015/0125839 A1 5/2015 Tillges et al.
2015/0164323 A1 6/2015 Holtzclaw
2015/0182843 A1 7/2015 Esposito et al.
2015/0309598 A1 10/2015 Zeliff et al.
2016/0092651 A1 3/2016 Austin et al.
2016/0105923 A1 4/2016 Chen et al.
2016/0120433 A1 5/2016 Hughes et al.
2016/0135731 A1 5/2016 Drennan
2016/0213924 A1 7/2016 Coleman et al.
2016/0228050 A1 8/2016 Sugla et al.
2016/0256080 A1 9/2016 Shen et al.
2016/0275776 A1 9/2016 Shen et al.
2016/0296144 A1 10/2016 Gaddam et al.
2016/0317084 A1 11/2016 DeLuke et al.
2016/0331322 A1 11/2016 Son et al.
2016/0367192 A1 12/2016 Iyengar et al.
2017/0011210 A1 1/2017 Cheong et al.
2017/0027498 A1 2/2017 Larson et al.
2017/0027529 A1 2/2017 Frieder et al.
2017/0055851 A1 3/2017 Al-Ali
2017/0055896 A1 3/2017 Al-Ali et al.
2017/0056724 A1 3/2017 Baker
2017/0160400 A1 6/2017 Larbi
2017/0225033 A1 8/2017 Czaja
2017/0231015 A1 8/2017 Jang et al.
2017/0281073 A1 10/2017 Drennan et al.
2017/0347899 A1 12/2017 Bhushan et al.
2017/0367644 A1 12/2017 Sharman et al.
2018/0000407 A1 1/2018 Johnson et al.
2018/0020931 A1 1/2018 Shusterman
2018/0025146 A1 1/2018 Vasyltsov et al.
2018/0054509 A1* 2/2018 Nuescheler ........... H04W 76/14
2018/0074547 A1 3/2018 Smadi et al.
2018/0092607 A1* 4/2018 Domeika ............... G16H 40/67
2018/0103030 A1* 4/2018 Einberg .................. G06F 1/163
2018/0103874 A1 4/2018 Lee et al.
2018/0103917 A1 4/2018 Kim et al.
2018/0132287 A1 5/2018 Cheng et al.
2018/0208208 A1 7/2018 Chen
2018/0239932 A1* 8/2018 Gummeson ........... H04W 12/08
2018/0271409 A1 9/2018 Gong et al.
2018/0360157 A1 12/2018 Jeong et al.
2019/0029902 A1 1/2019 Darnold et al.
2019/0082771 A1 3/2019 Shin et al.
2019/0090781 A1 3/2019 Selvaraj et al.
2019/0097809 A1 3/2019 Dan et al.
2021/0379255 A2 12/2021 Weston
2023/0157897 A1 5/2023 Engel et al.

FOREIGN PATENT DOCUMENTS

DE 19612334 A1 1/1997
DE 102013013013 A1 2/2015
DE 102014222955 A1 5/2016
EP 2675315 B1 5/2020
GB 2447674 A 9/2008
JP 2005245709 A 9/2005

(56) References Cited

FOREIGN PATENT DOCUMENTS

| | | | |
|---|---|---|---|
| JP | 2007179169 | A | 7/2007 |
| JP | 5272583 | B2 | 8/2013 |
| JP | 2014046151 | A | 3/2014 |
| WO | WO-2005121729 | A1 | 12/2005 |
| WO | WO-2013064852 | A1 | 5/2013 |
| WO | WO-2014178755 | A1 | 11/2014 |
| WO | WO-2016018448 | A1 | 2/2016 |
| WO | WO-2016154230 | A1 | 9/2016 |
| WO | WO-2016180073 | A1 | 11/2016 |
| WO | WO-2016182506 | A1 | 11/2016 |
| WO | WO-2016186904 | A1 | 11/2016 |
| WO | WO-2017048979 | A1 | 3/2017 |
| WO | WO-2017205728 | A1 | 11/2017 |
| WO | WO-2017214188 | A1 | 12/2017 |
| WO | WO-2018096390 | A1 | 5/2018 |
| WO | WO-2018144946 | A1 | 8/2018 |
| WO | WO-2018162736 | A1 | 9/2018 |
| WO | WO-2019042790 | A1 | 3/2019 |
| WO | WO-2019096828 | A1 | 5/2019 |
| WO | WO-2019162272 | A1 | 8/2019 |
| WO | WO-2019234011 | A1 | 12/2019 |
| WO | WO-2019238927 | A1 | 12/2019 |
| WO | WO-2019243171 | A1 | 12/2019 |
| WO | WO-2020178036 | A1 | 9/2020 |

OTHER PUBLICATIONS

Amjadi M., et al., "Ultra-Stretchable and Skin-Mountable Strain Sensors Using Carbon Nanotubes-Ecoflex Nanocomposites," Nanotechnology, Institute of Physics Publishing, vol. 26, No. 37, Aug. 25, 2015, 11 pages.

Centauri Medical, Inc., "DynaSense—Instructions for Use," Document No. 1312AJ (User Manual), Jul. 2013, 54 pages.

Crews R., et al., "A Method for Assessing Off-loading Compliance," Journal of the American Podiatric Medical Association, vol. 99 (2), Mar./Apr. 2009, 6 pages.

Crews R., et al., "Role and Determinants of Adherence to Off-loading in Diabetic Foot Ulcer Healing: A Prospective Investigation," Diabetes Care, vol. 39, Aug. 2016, pp. 1371-1377 (7 pages).

Fitbit, "Introducing Fitbit Coach," YouTube, retrieved from https://www.youtube.com/watch?v=QDYxWeQMrAw, Oct. 24, 2017, 1 page.

Hanft J., et al., "A Guide To Preventative Offloading of Diabetic Foot Ulcers," Podiatry Today, Nov. 2011, retrieved from www.podiatrytoday.com/guide-preventative-offloading-diabetic-foot-ulcers, 8 pages.

International Preliminary Report on Patentability for Application No. PCT/EP2019/064469, mailed on Dec. 17, 2020, 7 pages.

International Search Report and Written Opinion for Application No. PCT/EP2019/064469, mailed on Sep. 20, 2019, 8 pages.

International Search Report and Written Opinion for Application No. PCT/EP2022/082855, mailed on Feb. 14, 2023, 13 pages.

Kosecki D., "9 Things You Need to Know About Your New Fitbit Coach Subscription," Fitbit, Dec. 22, 2017, retrieved from https://blog.fitbit.com/new-fitbit-coach/, 12 pages.

Muscillo R., et al., "An Adaptive Kalman-Based Bayes Estimation Technique to Classify Locomotor Activities in Young and Elderly Adults Through Accelerometers," Medical Engineering & Physics, Butterworth-Heinemann, GB, vol. 32, No. 8, Oct. 1, 2010 (Oct. 1, 2010), pp. 849-859, XP027267622, ISSN:1350-4533 [retrieved on Jun. 23, 2010] the whole document.

Nakamoto., H., et al., "Stretchable Strain Sensor with Anisotropy and Application for Joint Angle Measurement," IEEE Sensors Journal, vol. 16, No. 10, May 2016, pp. 3572-3579.

Raviglione A., et al., "Real-Time Smart Textile-Based System to Monitor Pressure Offloading of Diabetic Foot Ulcers," Journal of Diabetes Science and Technology, vol. 11, Sep. 2017, 5 pages.

Smith and Nephew Medical Ltd., "SANDY 20129806—Healthcare Professional User Manual," Jul. 2018, retrieved from https://apps.fcc.gov/oetcf/eas/reports/ViewExhibitReport.cfm?mode=Exhibits&calledFromFrame=N&application_id=f%2FbhDROytnS96PwjOmDTNA%3D%3D&fcc_id=2AEAJ-2012980, retrieved on Aug. 22, 2018, 8 pages.

Tairych A., et al., "Distributed Sensing: Multiple Capacitive Stretch Sensors on a Single Channel," Proceedings of SPIE, vol. 10163, Apr. 17, 2017, pp. 1016306-1-1016306-10.

Votzke C., et al., "Highly-Stretchable Biomechanical Strain Sensor Using Printed Liquid Metal Paste," IEEE Biomedical Circuits and Systems Conference (BIOCAS), Oct. 17, 2018, XP033483141, 4 pages.

Abhyankar S., et al., "On the Application of Traffic Engineering over Bluetooth Ad Hoc Networks," Conference: Proceedings of the 6th International Symposium on Modeling Analysis and Simulation of Wireless and Mobile Systems, Sep. 19, 2003, pp. 116-123.

Wenqiang J., et al., "Harnessing the Ambient Radio Frequency Noise for Wearable Device Pairing," Proceedings of the 33rd Annual ACM Symposium on User Interface Software and Technology, ACMPUB27, New York, NY, USA, Oct. 30, 2020, XP058727358, DOI: 10.1145/3372297.3417288, ISBN: 978-1-4503-7514-6, pp. 1135-1148.

* cited by examiner

DEVICE COMMUNICATION MANAGEMENT IN USER ACTIVITY MONITORING SYSTEMS

CROSS-REFERENCE TO RELATED APPLICATIONS

This application is a continuation of U.S. patent application Ser. No. 17/946,586, filed Sep. 16, 2022, which is a continuation of U.S. patent application Ser. No. 17/041,975, filed Sep. 25, 2020, which is a U.S. national stage application of International Patent Application No. PCT/EP2019/064469, filed Jun. 4, 2019, which claims priority to U.K. Provisional Application Nos. 1809081.1 and 1809146.2 respectively filed on Jun. 4, 2018, and Jun. 5, 2018; the disclosures of which are hereby incorporated by reference in their entirety.

BACKGROUND

Field

Embodiments of the present disclosure relate to apparatuses, systems, and methods for managing communication between user activity monitoring devices and data processing devices.

Description of Related Art

Pressure ulcers, which may also be known as pressure sores, bedsores, or decubitus ulcers, are injuries to skin and underlying tissue resulting from prolonged pressure on the skin, soft tissue, muscle, or bone above capillary filling pressure (approximately 32 mmHg).

One type of pressure ulcer that develops on a foot is known as a diabetic foot ulcer (DFU), which tends to occur with a higher frequency and intensity in the diabetic population. Management and treatment of diabetic foot ulcers requires offloading the diabetic foot ulcers by using cushioned footwear, such as a support boot, cast, shoe, or the like. While offloading can be effective, it has been found that non-compliance with or non-use of the offloading devices can play a large role in the delayed healing of the diabetic foot ulcers.

Prior art approaches and systems provide little or no information regarding an individual's lifestyle and compliance with the offloading devices. Gaining insight into the individual's lifestyle can be important for the prevention and healing of pressure ulcers. However, because of these limitations, the prevention and healing of pressure ulcers using prior art approaches and systems may be delayed or, worse yet, worsened leading to prolonged discomfort, hospitalization, or even surgery.

BRIEF DESCRIPTION OF THE DRAWINGS

Embodiments of the present disclosure will now be described hereinafter, by way of example only, with reference to the accompanying drawings in which.

DETAILED DESCRIPTION

Overview

Figure 1A:
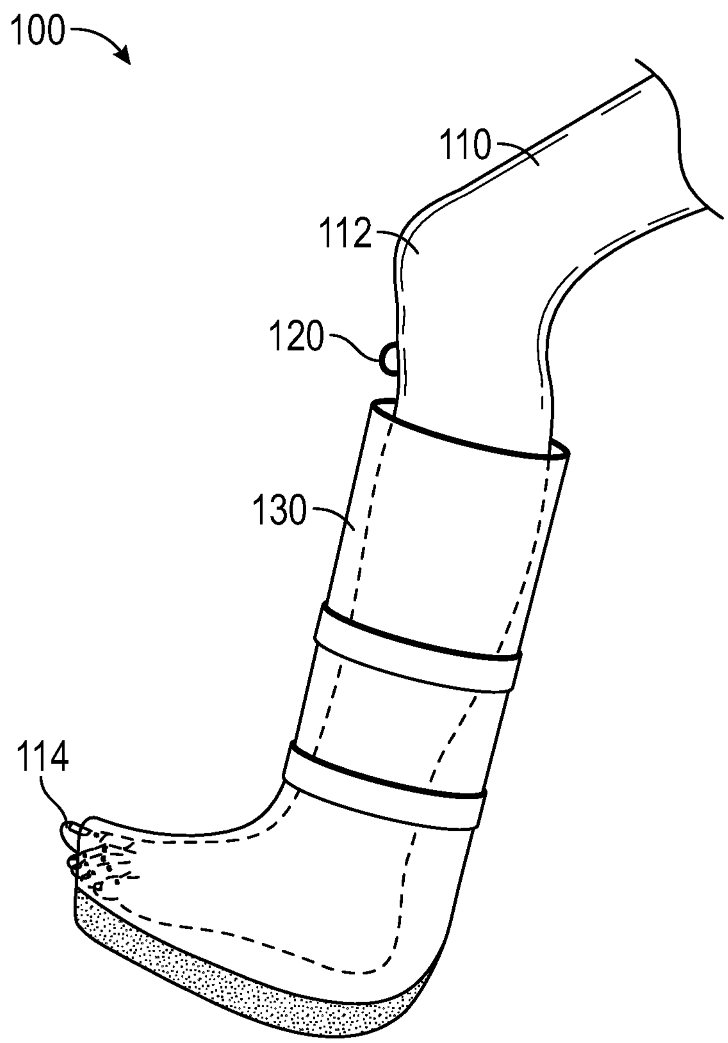
FIG. 1A illustrates a user activity monitoring system including an example activity monitoring device.

At least some aspects disclosed herein relate to apparatuses, systems, and methods for using out-of-band communication (for example, via near-field communication, visible light, or device vibration) to securely arrange in-band communication (for example, via radio waves) between an activity monitoring device and a data processing device. Once in-band communication between the activity monitoring device and the data processing device has been setup via out-of-band communication, the activity monitoring device can, for example, transmit data gathered by the activity monitoring device to the data processing device via in-band communication, and the data processing device to transmit via in-band communication commands to the activity monitoring device, such as for adjusting operations of the activity monitoring device. The data gathered by the activity monitoring device can advantageously, in certain aspects, be used to prevent, monitor, or otherwise manage pressure ulcers for a user of the activity monitoring device.

In one example, a motor and accelerometer can be used as a method of communication for the purpose of out-of-band pairing of the activity monitoring device and the data processing device. The data processing device can, for example, asynchronously communicate via vibration impulses of the motor, and the accelerometer of the activity monitoring device can be used to detect the vibration impulses. The vibration impulses can be used by the data processing device to share an encryption key for the purpose of secure communication, such as via radio waves using a protocol like a Bluetooth™ Low Energy protocol.

The activity monitoring device of the preceding paragraph can be a sensor device that includes a wireless communication module, an accelerometer, and an encapsulate. The encapsulate can be a conductive material or dielectric material that is detectable by a touchscreen, such as of the data processing device. The data processing device of the preceding paragraph can, for instance, be a smart phone or tablet computer and include a vibrating motor, a wireless communications module, and a touchscreen. The touchscreen can indicate a location on the touchscreen that the activity monitoring device is to be placed. The touchscreen can be used to detected when the activity monitoring device is placed due to the encapsulate of the activity monitoring device and the dimensions of the activity monitoring device. Once placement is detected, the data processing device can either pulse the vibrating motor in a pre-determined pattern to initiate a pairing process or find a closest wireless communicating device (such as one communicating via an expected protocol like a Bluetooth™ Low Energy protocol) and initiate the pairing process via wireless communications. Once pairing has initiated, the communication channel from the vibrating motor to the accelerometer can be used as a secure out-of-band communication method for transmitting encryption keys. Such an approach advantageously can, in certain aspects, permit more complex keys to be used than if the keys were entered manually by a user because automatic transfer of the keys makes the transfer process minimally onerous on the user regardless of the complexity of the keys.

Although an activity monitoring device and a data processing device are used as examples to describe certain features described herein, at least some of the features can apply more broadly to communication between two electronic devices that may perform one or more additional or alternative functions than those described for an activity monitoring device and a data processing device.

In some implementations, a sensor congruency can be used as authentication. A unique physical input (for example, caused by a motor vibration or due to muscle tremors of a user) to two accelerometers or other type of sensor in two devices, can provide an authentication method. The two accelerometers or other type of sensor can function as an out-of-band communication for device pairing. One device can record motion via its accelerometer and can pass data indicative of the recorded motion to the other device. The other device can compare the received data with what it recorded. Because both devices may have been given the same input, this can confirm both device are in contact and may be paired.

A light, such as a light emitting diode, may emit light, and an amount of light absorbed or reflected can be measured with a camera in some aspects to assist with positioning or identifying a device. In some such aspects, a polymer used to cover a device can function in part as a fiber optic to assist with transfer of light.

Although some examples described herein may describe out-of-band communication as being unidirectional for convenience, out-of-band communication can instead be bidirectional.

A data processing device can, for instance, facilitate movement of an activity monitoring device in a predefined pattern that is recognizable by the activity monitoring device to correspond to a pairing vibration or motion. The activity monitoring device can, in turn, enable wireless communications between the activity monitoring device and the data processing device responsive to the activity monitoring device detecting the predefined pattern.

When an activity monitoring device may be partly or fully covered in a touchscreen sensitive material, a data processing device can record movement by the activity monitoring device across the touchscreen as movement data. The movement data can be recorded as would movement of a finger across the touchscreen, such as to detect a swiping of the finger. The movement data can be compared by the data processing device or the activity monitoring device to position data (such as, double-integrated motion data gathered by an accelerometer) for the activity monitoring device. Such an approach can provide a way to validate that the activity monitoring device and the data processing device should be connected. Moreover, such an approach can provide a defense against a man-in-the-middle attack because a manual physical interaction may be part of the pairing process.

In some aspects, an activity monitoring device may be less than fully covered in a touchscreen sensitive material. The portion of the activity monitoring device that is covered with the touchscreen sensitive material can be selected to create a distinctive device signature which can be detected by a touchscreen of a data processing device. Moreover, the device signature can be controlled or varied by setting a resistance (such as, a fixed resistance) between individual touch-sensitive portions (such as, pads) of the activity monitoring device. The device signature can desirably, in certain aspects, be used to provide confidence in what device is in contact with the touchscreen. In some implementations, the confidence can further be quantified as a value and used to control one or more outputs or communications disclosed herein.

One or more features disclosed herein can, in certain aspects, desirably help prevent a man-in-the-middle attack where an attacker may secretly relay and possibly alter communication between two electronic devices that believe they are directly communicating with each other. The one or more features can at least help prevent the man-in-the-middle attack by assisting with establishing a secure communication between the two electronic devices where it may be very difficult for the attacker to circumvent mutual authentication and for the attacker to impersonate each of the two electronic devices.

Introduction to User Activity Monitoring

Activities of a user may be desirably monitored by an activity monitoring device for a variety of reasons, including wound prevention and monitoring. In one example, the activities of a user can be monitored when the user may be prone to or already have a wound, such as a pressure ulcer. Information gathered by the activity monitoring device about the activities of the user can be helpful for assisting with prevention or treatment of the pressure ulcer. In addition, information gathered by the activity monitoring device about the activities can be useful for checking compliance with a treatment regimen.

Some aspects disclosed herein relate to wound monitoring or therapy for a human or animal body. Therefore, any reference to a wound herein can refer to a wound on a human or animal body, and any reference to a body herein can refer to a human or animal body. The disclosed technology may relate to preventing or minimizing damage to physiological tissue or living tissue, or to the treatment of damaged tissue (for example, a wound as described herein).

As used herein the expression "wound" may include an injury to living tissue may be caused by a cut, blow, or other impact, typically one in which the skin is cut or broken. A wound may be a chronic or acute injury. Acute wounds occur as a result of surgery or trauma. They move through the stages of healing within a predicted timeframe. Chronic wounds typically begin as acute wounds. The acute wound can become a chronic wound when it does not follow the healing stages resulting in a lengthened recovery. It is believed that the transition from acute to chronic wound can be due to a patient being immuno-compromised.

Chronic wounds may include for example: venous ulcers (such as those that occur in the legs), which account for the majority of chronic wounds and mostly affect the elderly, diabetic ulcers (for example, foot or ankle ulcers), peripheral arterial disease, pressure ulcers, or epidermolysis bullosa (EB).

Examples of other wounds include, but are not limited to, abdominal wounds or other large or incisional wounds, either as a result of surgery, trauma, sternotomies, fasciotomies, or other conditions, dehisced wounds, acute wounds, chronic wounds, subacute and dehisced wounds, traumatic wounds, flaps and skin grafts, lacerations, abrasions, contusions, burns, diabetic ulcers, pressure ulcers, stoma, surgical wounds, trauma and venous ulcers or the like.

Wounds may include a deep tissue injury. Deep tissue injury is a term proposed by the National Pressure Ulcer Advisory Panel (NPUAP) to describe a unique form of pressure ulcers. These ulcers have been described by clinicians for many years with terms such as purple pressure ulcers, ulcers that are likely to deteriorate and bruises on bony prominences.

Wound may include tissue at risk of becoming a wound as discussed herein. For example, tissue at risk may include tissue over a bony protuberance (at risk of deep tissue injury/insult) or pre-surgical tissue (for example, knee tissue) that may has the potential to be cut (for example, for joint replacement/surgical alteration/reconstruction).

Some aspects relate to methods of monitoring or treating a wound with the technology disclosed herein in conjunction with one or more of the following: advanced footwear, turning a patient, offloading (such as, offloading diabetic foot ulcers), treatment of infection, systemix, antimicrobial, antibiotics, surgery, removal of tissue, affecting blood flow, physiotherapy, exercise, bathing, nutrition, hydration, nerve stimulation, ultrasound, electrostimulation, oxygen therapy, microwave therapy, active agents ozone, antibiotics, antimicrobials, or the like.

Alternatively or additionally, a wound may be treated using topical negative pressure or traditional advanced wound care, which is not aided by the using of applied negative pressure (may also be referred to as non-negative pressure therapy).

Although the present disclosure may refer to pressure ulcers, foot ulcers, or the like, the systems and methods disclosed herein can be used for preventing, monitoring, or treating any type of skin injury or wound, such as a venous leg ulcer.

User Activity Monitoring System

FIG. 1A illustrates a user activity monitoring system 100 including an activity monitoring device 120 attached to a body part 110. The activity monitoring device 120 can be attached to the body part 110 using a strap, adhesive, or other coupling mechanism and may be worn on or supported by the body.

The body part 110 can be a leg of a user that includes a knee 112 and a foot 114. As illustrated the activity monitoring device 120 can be supported by the body part 110 at a position between the knee 112 and the foot 114, such as proximate to the knee 112. In other aspects, the activity monitoring device 120 can be supported by another part of the body part 110, such as above the knee 112 or elsewhere. The activity monitoring device 120 can be supported using a strap, adhesive, or other coupling mechanism. The activity monitoring device 120 can monitor and record activities (for instance, walking, jumping, sitting, laying down, running, squatting, or standing) of the body part 110, such as from a position, movement, or orientation of the activity monitoring device 120 or one or more other sensors of the activity monitoring device 120. The activity monitoring device 120 can, for example, be used for loading monitoring of loading of the foot 114. In certain aspects, multiple body parts can be monitored by the activity monitoring device 120, and different sensors can be used for monitoring different body parts.

The body part 110 is shown wearing and being partly covered by an orthopedic device 130 (sometimes referred to as an offloading device). The orthopedic device 130 can support the body part 110 and reduce a pressure on the foot 114 when the user may be standing or engaging in other activities.

Although not illustrated in FIG. 1A, the user activity monitoring system 100 can additionally or alternatively include one or more of the activity monitoring device 120 at other positions, such as at a position supported by the orthopedic device 130, another part of the body part 110, another device not worn such as a cane or a walker, or elsewhere. These one or more additional or alternative of the activity monitoring device 120 can be the same as or similar to the activity monitoring device 120 may monitor and record activities of the orthopedic device 130, the another part of the body part 110, or the body.

Figure 1B:
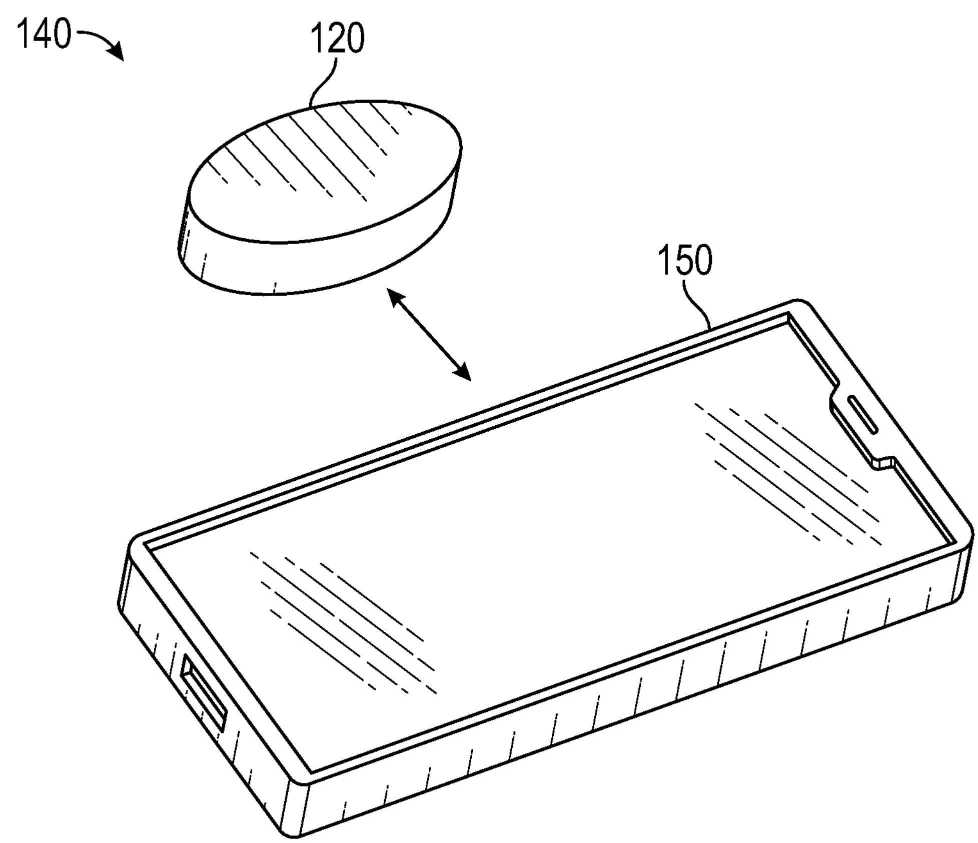
FIG. 1B illustrates the activity monitoring device of FIG. 1A in communication with an example data processing device.

FIG. 1B illustrates a data transfer system 140 that includes the activity monitoring device 120 and a data processing device 150. The activity monitoring device 120 can be positioned proximate to the data processing device 150 and communicate, such as wirelessly, with the data processing device 150.

The activity monitoring device 120 and the data processing device 150 can together configure a communication channel with one another to permit transfer of recorded activities or other data from the activity monitoring device 120 and the data processing device 150 or transfer of one or more commands from the data processing device 150 to the activity monitoring device 120, among other possibilities. As described herein, the activity monitoring device 120 and the data processing device 150 can configure the communication channel, such as a radio wave channel, using out-of-band communication, such as via a motion communication channel or an optical communication channel. The data processing device 150 can, for example, be a smart phone or a tablet computer.

The activity monitoring device 120 can at least partly or may be fully covered by conductive material, dielectric material, or the like (for instance, a polymer or that may approximate a conductance or capacitance of a human finger). The data processing device 150 can include a touch-sensitive display that detects the conductive or dielectric material on the activity monitoring device 120 to determine contact between the activity monitoring device 120 and the display of the data processing device 150.

Figure 2:
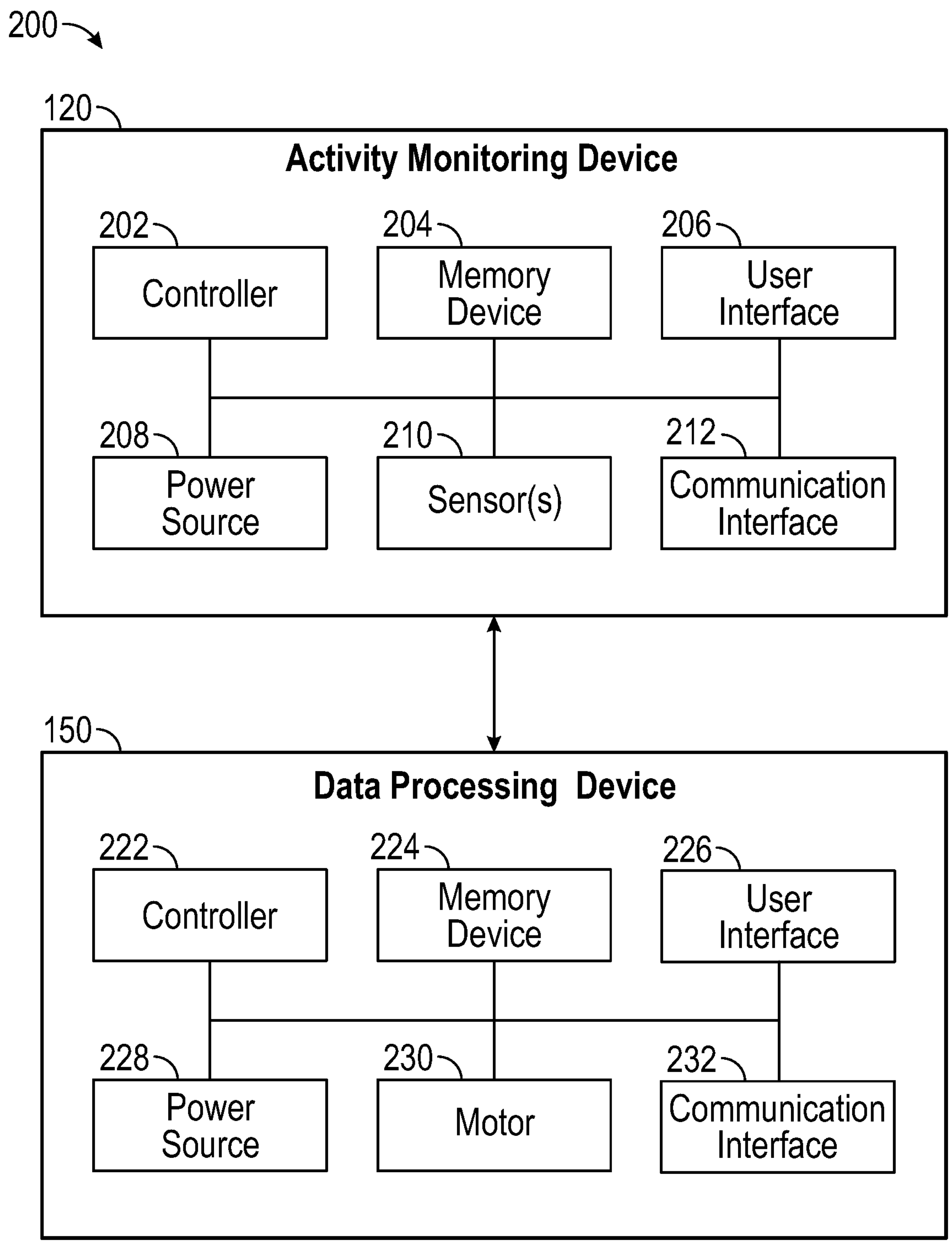
FIG. 2 illustrates example components of the activity monitoring device of FIG. 1A and the data processing device of FIG. 1B.

FIG. 2 illustrates components 200 of the activity monitoring device 120 and the data processing device 150. The activity monitoring device 120 can include a controller 202, a memory device 204, a user interface 206, a power source 208, one or more sensors 210, and a communication interface 212 that are configured to communicate, such as electrically communicate, with one another. The power source 208 can provide power to one or more components of the activity monitoring device 120.

The components of the activity monitoring device 120 can be contained in or supported by a housing of the activity monitoring device 120. The housing can be composed of a top portion and a bottom portion that are sealed together, and the top portion or the bottom portion can be hard or soft. The housing can be flexible and have a mechanical structure and design features that provide for a shouldered keyway alignment of components within the housing. The housing can support a circuit board on its inside and on which one or more components of the activity monitoring device 120 may be positioned.

The data processing device 150 can include a controller 222, a memory device 224, a user interface 226, a power source 228, a motor 230, and a wireless communication interface 232 that are configured to electrically communicate with one another. The power source 228 can provide power to one or more components of the data processing device 150. The components of the data processing device 150 can be contained in or supported by a housing of the data processing device 150. In other aspects, the activity monitoring device 120 and the data processing device 150 can include additional or alternative components than those illustrated in FIG. 2.

The controller 202 can control operations of one or more other components (for instance, the memory device 204, the user interface 206, the power source 208, the one or more sensors 210, or the communication interface 212) of the activity monitoring device 120 according at least to instructions stored in the memory device 204. The controller 202 can, for instance, control monitoring of loading of the body part 110 with a weight of the body or positioning of the body part 110 and record data indicative of loading of the body part 110 or positioning of the body part 110 to the memory device 204.

The user interface 206 can include one or more output elements, such as visual feedback devices (for example, light emitting diodes), haptic feedback devices, or audio devices (for example, speakers), that provide user outputs to a user. The one or more elements can convey status information to the user like whether the activity monitoring device 120 is successfully functioning or has successfully configured communication with the data processing device 150. In some aspects, the user interface 206 may not include one or more input elements, such as buttons, switches, dials, touch pads, microphones, or touch screens, for receiving user inputs for configuring the activity monitoring device 120. In such aspects, the activity monitoring device 120 can arrive to a user preconfigured so that the activity monitoring device 120 is able to function without receiving such user inputs, or the activity monitoring device 120 can be configured through communication with another device, such as the data processing device 150. In some aspects, the user interface 206 may have no more than one user input element, such as a button, for receiving user inputs to activate and deactivate the activity monitoring device 120 or performing one or more other functions.

The one or more sensors 210 can be used to detect and monitor a motion of the activity monitoring device 120 or other characteristics of or around the activity monitoring device 120. Certain motion of the activity monitoring device 120 can be recognized by the controller 202 to cause initiation of or complete particular functions, such as initiating or authenticating a communication pairing between the activity monitoring device 120 and the data processing device 150 to permit future communication. In addition, the one or more sensors 210 can be used to detect and monitor activities of the user of the activity monitoring device 120 that include, for instance, a loading or positioning of the body part 110. The one or more sensors 210 can include one or more accelerometers, gyroscopes, magnetometers, impedance sensors, thermistors, pressure sensors, or optical sensors, among other types of sensors. The one or more sensors 210 can be positioned proximate to the body part 110 or may be remote from the body part 110 yet usable to monitor characteristics of the body part 110.

The communication interface 212 can be used to communicate with the data processing device 150, such as via radio waves and according to a Bluetooth™ protocol like a Bluetooth™ Low Energy protocol or another protocol. The communication interface 212 can, for example, communicate and pair with other devices and transmit device usage or sensor data like alarms, monitored loading or positioning, or changes to a monitoring or therapy program performed by the activity monitoring device 120 to the data processing device 150. The communication interface 212 can be used to receive data, including commands, from the data processing device 150.

The communication interface 212 can be permitted to communicate with (for example, transfer data to or process commands from) the data processing device 150 once a communication channel is configured (for example, by device pairing) between the communication interface 212 and the data processing device 150 but not before the communication channel is configured. The configuration of the communication channel can be performed out-of-band and may not, in some implementations, be performed entirely or partly using the communication interface 212.

Turning to the data processing device 150, as illustrated in FIG. 2, the controller 222 of the data processing device 150 can control operations of one or more other components of the data processing device 150 according at least to instructions stored in the memory device 224. The controller 222 can, for instance, configure and control communication with the activity monitoring device 120, as well as process data received from the activity monitoring device 120 or send commands to the activity monitoring device 120. The data processing device 150 can executed one or more applications to assist with communicating with the activity monitoring device 120.

The user interface 226 of the data processing device 150 can include one or more elements that receive user inputs or provide user outputs to a user. The one or more input elements of the user interface 226 that receive user inputs can include buttons, switches, dials, touch screens, or the like, and the one or more output elements that provide user outputs can include indicators, screens, speakers, or the like. The user outputs can, for instance, indicate to a user how to move the activity monitoring device 120 in a motion sequence to enable communication between the activity monitoring device 120 and the data processing device 150 via the communication interface 212 of the activity monitoring device 120.

The motor 230 can be driven to cause the data processing device 150 to move or vibrate. The motor can, for example, cause the data processing device 150 to move in a motion sequence that matches a motion sequence recognizable by the activity monitoring device 120. As a result, when the data processing device 150 may be positioned against the activity monitoring device 120, the data processing device 150 can cause the activity monitoring device 120 to also move in the motion sequence.

The wireless communication interface 232 of the data processing device 150 can be used to communicate with the activity monitoring device 120, such as via radio waves and according to a Bluetooth™ protocol like a Bluetooth™ Low Energy protocol or another protocol. The wireless communication interface 232 can, for example, receive device usage data like alarms, monitored loading or positioning, or changes to a monitoring or therapy program performed by the activity monitoring device 120 or transmit data like commands.

Device Communication Management

Figure 3:
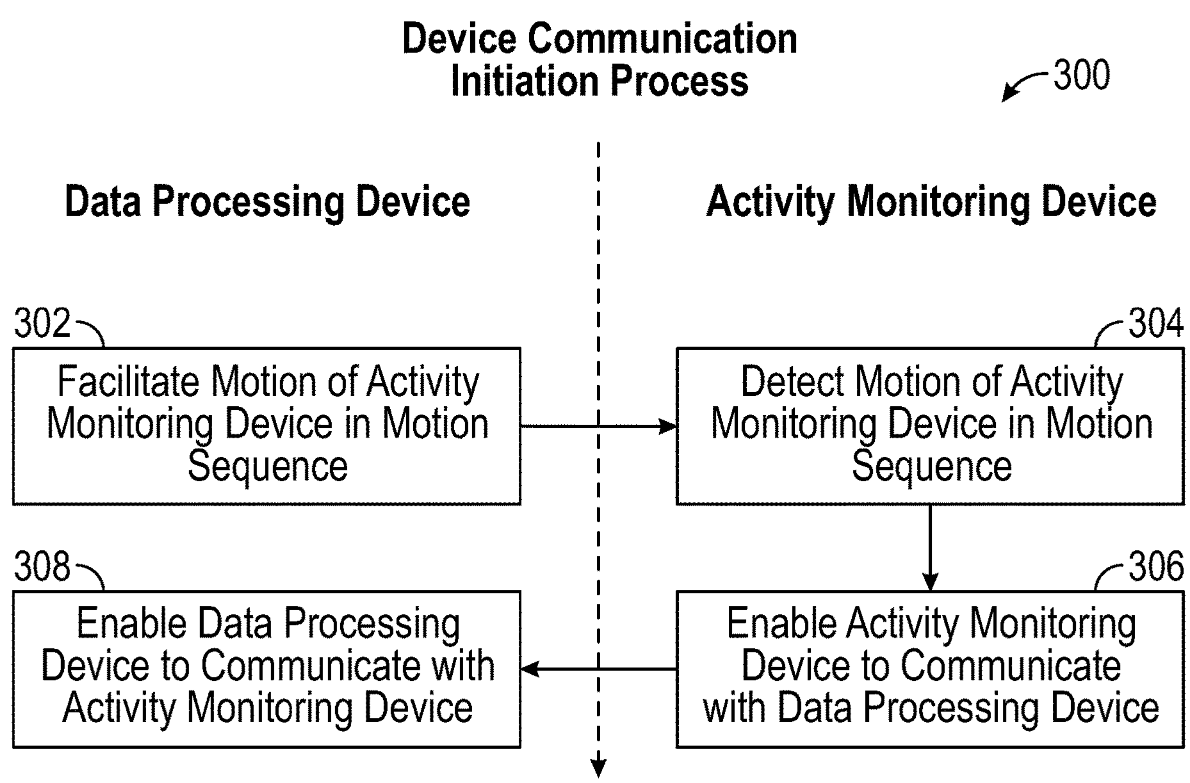
FIG. 3 illustrates an example device communication initiation process.

FIG. 3 illustrates a device communication initiation process 300. For convenience, the process 300 is described in the context of the user activity monitoring system 100, but may instead be implemented in other components or systems described herein, or by other computing systems not shown. The process 300 can advantageously, in certain aspects, enable the activity monitoring device 120 and the data processing device 150 to establish a secure communication channel for transmitting information, such as data collected by the activity monitoring device 120 by activities of a user of the activity monitoring device 120.

At block 302, the process 300 can facilitate motion of an activity monitoring device in a motion sequence with a data processing device. For example, the data processing device 150 can facilitate movement of the activity monitoring device 120 by presenting motion sequence instructions to a user of the activity monitoring device 120 or by physically moving the data processing device 150 in the motion sequence when the activity monitoring device 120 is positioned against the data processing device 150.

At block 304, the process 300 can detect a motion of the activity monitoring device in the motion sequence. The one or more sensors 210 of the activity monitoring device 120 can, for example, monitor the motion of the activity monitoring device 120 and the controller 202 of the activity monitoring device 120 can determine that the monitored motion matches the motion sequence. The motion sequence may include one or both of an initiation sequence and an authentication sequence. The initiation sequence can cause the activity monitoring device 120 to enter a mode for beginning to establish a communication channel, such as via the communication interface 212, with another device, such as the data processing device 150. The authentication sequence can transfer authentication information, such as a key like an encryption key or a passkey, to authenticate and secure communication between the activity monitoring device 120 and the data processing device 150.

At block 306, the process 300 can enable the activity monitoring device to communicate with the data processing device. The activity monitoring device 120 can, for instance, be permitted to now communicate with the data processing device 150 via the communication interface 212. In one example, the activity monitoring device 120 can be permitted to communicate because the activity monitoring device 120 may be paired with the data processing device 150 responsive to detection of the motion of the activity monitoring device 120 in the motion sequence.

At block 308, the process 300 can enable the data processing device to communicate with the activity monitoring device. The data processing device 150 can, for instance, be permitted to now communicate with the activity monitoring device via the wireless communication interface 232. In one example, the data processing device 150 can be permitted to communicate because the data processing device 150 may be paired with the activity monitoring device 120.

Figure 4:
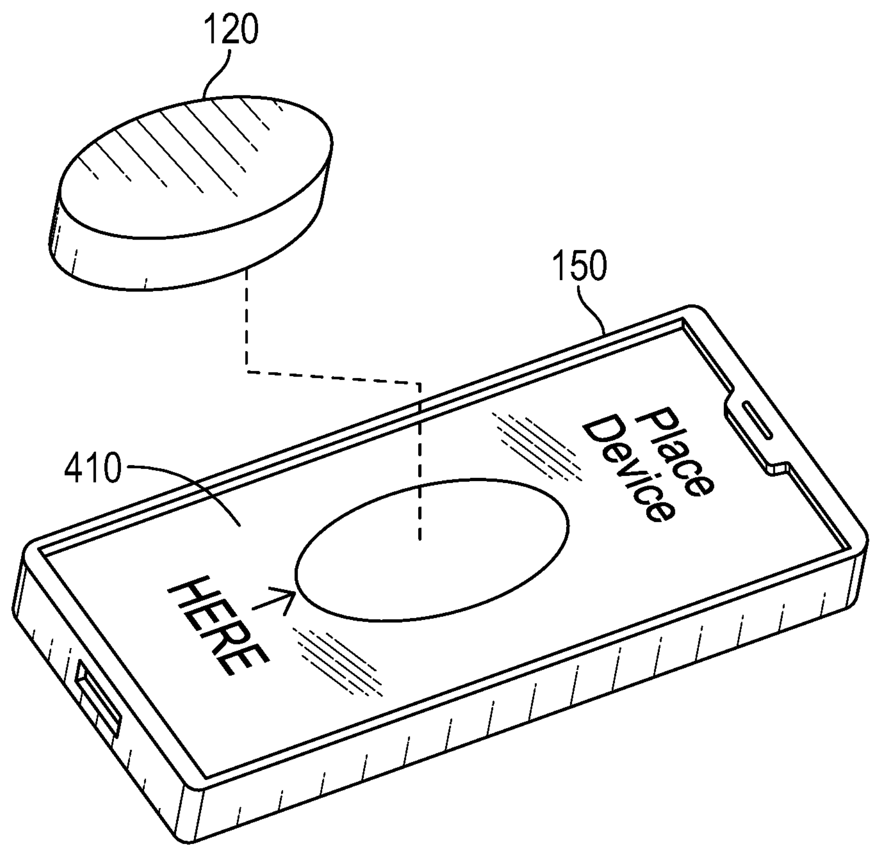
FIG. 4 illustrates the data processing device of FIG. 1B positioned to initiate communication with the activity monitoring device of FIG. 1A.

FIG. 4 illustrates the data processing device 150 positioned to communicate with the activity monitoring device 120. The data processing device 150 can include a display 410 that can indicate to a user to place the activity monitoring device 120 on the display 410 at a particular location indicated on the display 410 with a message like "PLACE DEVICE HERE." Placement of the activity monitoring device 120 device proximate or against the display 410 can desirably, in certain aspects, enable the data processing device 150 to assist the user in performing the motion sequence to enable communication between the activity monitoring device 120 and the data processing device 150.

The activity monitoring device 120 can be partly or entirely covered by a conductive material, a dielectric material, or the like, and the display 410 may be sensitive to conductive materials, dielectric materials, or the like. As a result, the display 410 can be used to detect contact of the activity monitoring device 120 to the display 410, as well as a placement of the activity monitoring device 120 on the display 410. In cases where contact is sufficient to facilitate communication between the activity monitoring device 120 and the data processing device 150, the contact may be used to trigger a next communication action. In cases where contact and positioning of the phone may be valuable (such as to ensure a proper vibrations transfer to the activity monitoring device 120), the display 410 can further display one or more messages indicating to move the activity monitoring device 120 on the display 410 so that the activity monitoring device 120 is positioned in a desired location.

Figure 5A:
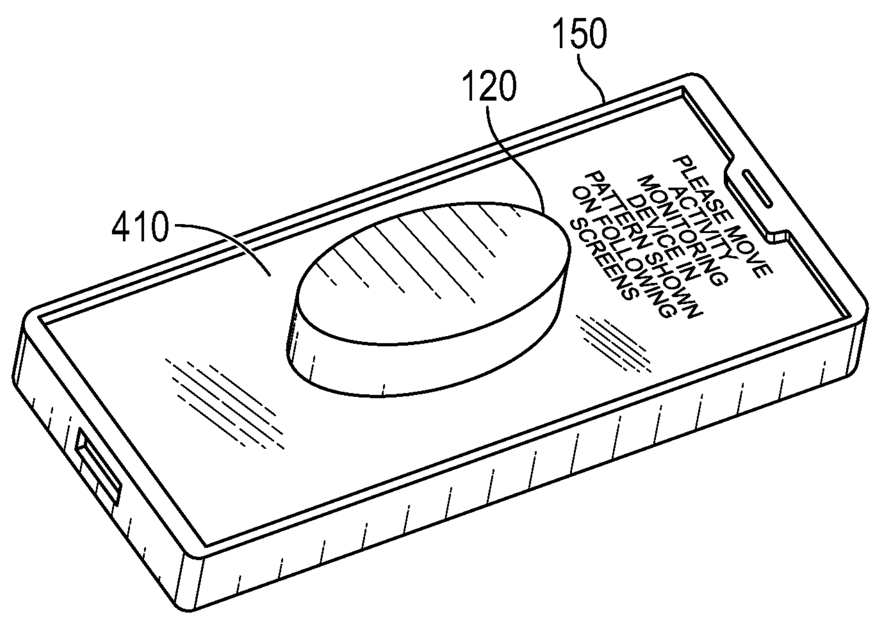
FIGS. 5A and 5B illustrate the data processing device of FIG. 1B instructing how to configure communication between the activity monitoring device of FIG. 1A and the data processing device.
Figure 5B:
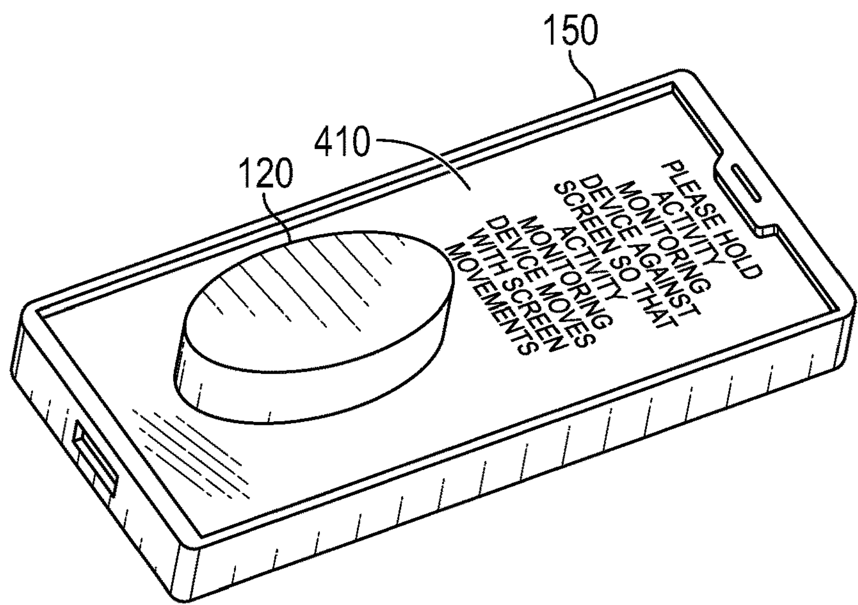

FIGS. 5A and 5B illustrate the data processing device 150 instructing how to configure communication between the activity monitoring device 120 and the data processing device 150, such as after the data processing device 150 detects contact or proper placement of the activity monitoring device 120.

As can be seen from FIG. 5A, the display 410 can provide instructions to a user to physically move the activity monitoring device 120 by displaying a message like "PLEASE MOVE ACTIVITY MONITORING DEVICE IN PATTERN SHOWN ON FOLLOWING SCREENS." The display 410 can, for instance, instruct the user to move the activity monitoring device 120 in a motion sequence that matches the motion sequence to cause the activity monitoring device 120 to communicate with the data processing device 150.

In one implementation, the display 410 can instruct the user to move the activity monitoring device 120 as provided in Table 1 to input the particular values to the activity monitoring device 120.

TABLE 1

| Device Motion | Input Value |
|---|---|
| Left | 0 |
| Right | 1 |
| Up | 2 |
| Down | 3 |
| Forward | 4 |
| Backward | 5 |
| Twist Right in X-axis | 6 |
| Twist Left in X-axis | 7 |
| Twist Right in Y-axis | 8 |
| Twist Left in Y-axis | 9 |

As one example use of Table 1, if the display 410 instructs the user to move the activity monitoring device 120 (*i*) left, (ii) forward, (iii) twist left in y-axis, and (iv) right, the display 410 can be instructing the user to input the values 0, 4, 9, and 1 to the activity monitoring device 120.

In yet another implementation, the display 410 can additionally or alternatively instruct the user to move the activity monitoring device 120 in a way that matches that of a virtual combination lock. The display 410 can guide the user through a series of left or right partial or full turns to input one or more values. For example, each N degree of twist of the activity monitoring device 120 can change an input value.

In some aspects, the activity monitoring device 120 can have labeling on one or more of its surfaces or one or more indicators to assist a user with inputting one or more values to configuration communication between the activity monitoring device 120 and the data processing device 150.

As can be seen from FIG. 5B, the display 410 can provide instructions to a user to hold the activity monitoring device 120 against the display 410 by displaying a message like "PLEASE HOLD ACTIVITY MONITORING DEVICE AGAINST SCREEN SO THAT ACTIVITY MONITORING DEVICE MOVES WITH SCREEN MOVEMENTS." Once the data processing device 150 detects contact with or proper placement of the activity monitoring device 120 against the display 410, the data processing device 150 can move in a motion sequence that matches a motion sequence recognized by the activity monitoring device 120 to cause the activity monitoring device 120 to begin communicating with (for example, pairing) the data processing device 150.

Figure 6A:
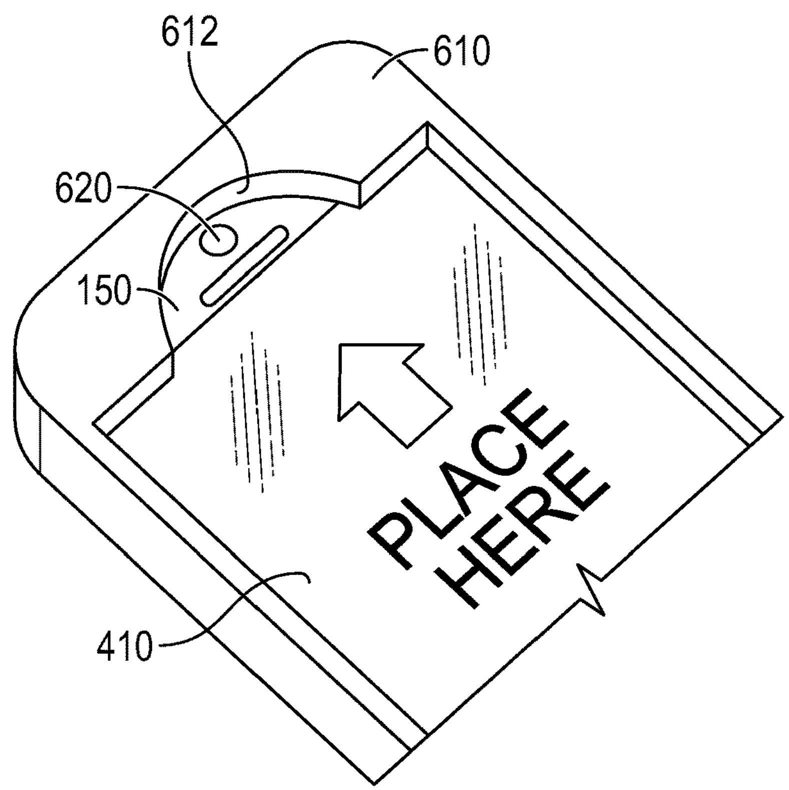
FIGS. 6A and 6B illustrate the data processing device of FIG. 1B with a case for assisting in placement of the activity monitoring device of FIG. 1A against the data processing device.
Figure 6B:
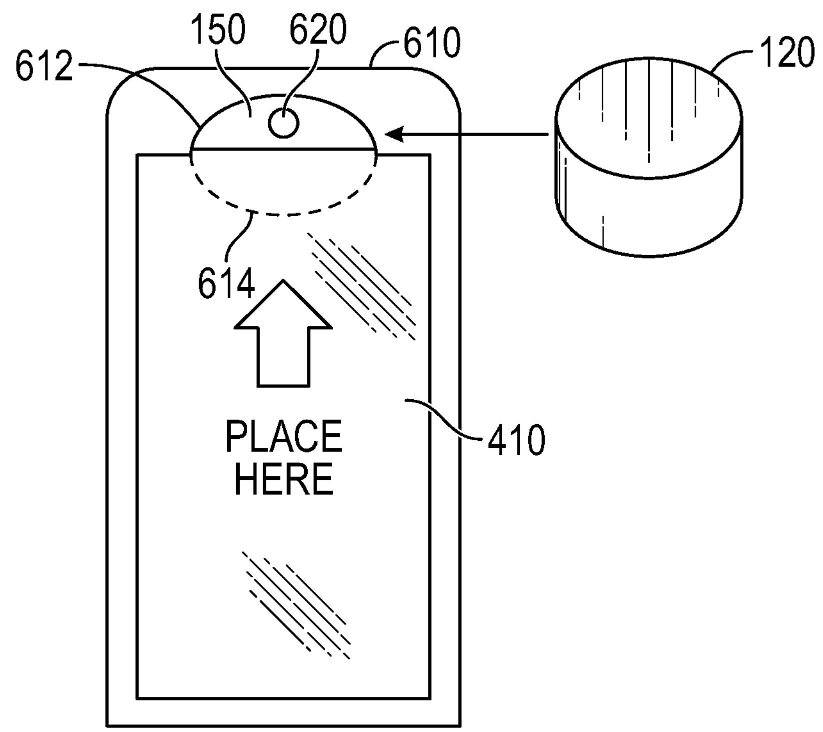

FIGS. 6A and 6B illustrate the data processing device 150 partly covered by a case 610 that can assist with coupling of the activity monitoring device 120 to the data processing device 150. As can be seen, the display 410 and its instructions to a user may be seen by the user through the case 610. The case 610 can include a groove 612 (or a slot or cutout) for snuggly positioning and supporting the activity monitoring device 120 by the data processing device 150. The groove 612 can help with passing vibrations or motions of the data processing device 150 to the activity monitoring device 120 when the activity monitoring device 120 is positioned and supported by the groove 612. Moreover, the display 410 can show a line 614 that identifies where the activity monitoring device 120 is to be positioned on the data processing device 150.

The data processing device 150 can also include a front camera 620 on a same side of the data processing device 150 as the display 410. The groove 612 can be desirably, in certain aspects, positioned and constructed so that the activity monitoring device 120 partly or entirely covers the front camera 620 when the activity monitoring device 120 is positioned properly against the data processing device 150. The front camera 620 can additionally or alternatively be used to detect proper placement of the activity monitoring device 120, such as before facilitating motion of the activity monitoring device 120 in a motion sequence by vibrating the data processing device 150.

Figure 7A:
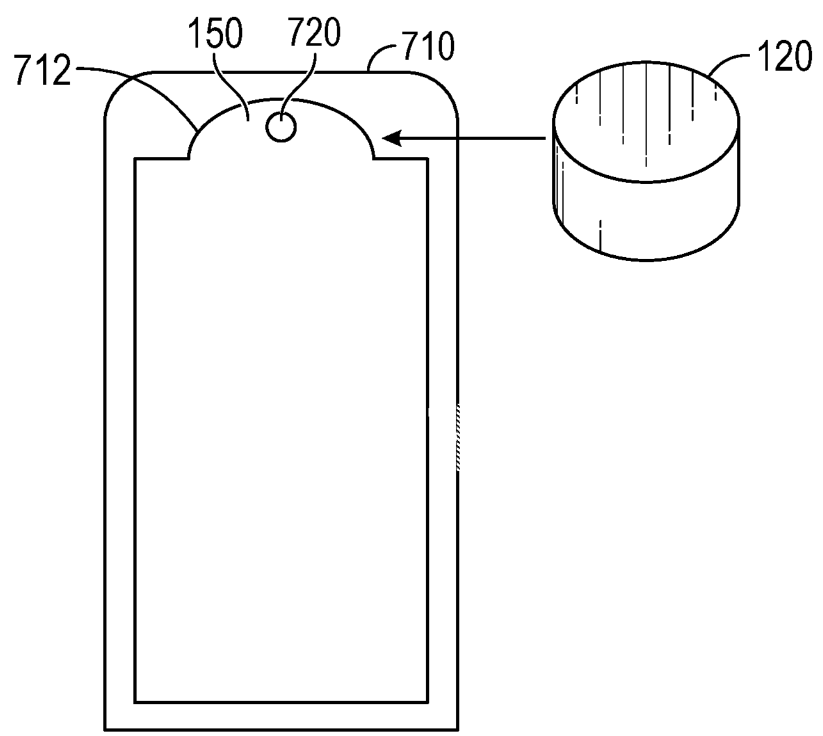
FIGS. 7A, 7B, and 7C illustrate the data processing device of FIG. 1B with alternative cases for assisting in placement of the activity monitoring device of FIG. 1A against the data processing device.

FIG. 7A illustrates the data processing device 150 partly covered by a case 710 that can assist with coupling of the activity monitoring device 120 to the data processing device 150. The case 710 can include a groove 712 (or a slot or cutout) for snuggly positioning and supporting the activity monitoring device 120 by the data processing device 150. The groove 712 can be on an opposite side of the data processing device 150 from the display 410. The groove 712 can help with passing vibrations or motions of the data processing device 150 to the activity monitoring device 120 when the activity monitoring device 120 is positioned and supported by the groove 712.

The data processing device 150 can include a rear camera 720 on the opposite side of the data processing device 150 from the display 410. The groove 712 can be desirably, in certain aspects, positioned and constructed so that the activity monitoring device 120 partly or entirely covers the rear camera 720 when the activity monitoring device 120 is positioned properly against the data processing device 150. The rear camera 720 can additionally or alternatively be used to detect proper placement of the activity monitoring device 120, such as before facilitating motion of the activity monitoring device 120 in a motion sequence by vibrating the data processing device 150.

Figure 7B:
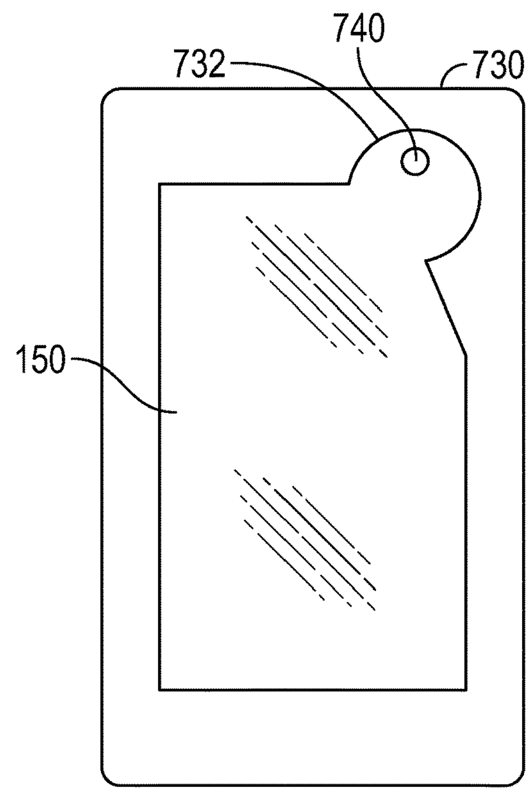

FIG. 7B illustrates the data processing device 150 partly covered by a case 730 that can assist with coupling of the activity monitoring device 120 to the data processing device 150. The case 730 can include a groove 732 (or a slot or cutout) for snuggly positioning and supporting the activity monitoring device 120 by the data processing device 150. The groove 732 can help with passing vibrations or motions of the data processing device 150 to the activity monitoring device 120 when the activity monitoring device 120 is positioned and supported by the groove 732. The groove 732 can be on an opposite side of the data processing device 150 from the display 410 and positioned so that the activity monitoring device 120 partly or entirely covers a rear camera 740 when the activity monitoring device 120 is positioned properly against the data processing device 150. The rear camera 740 can thus additionally or alternatively be used to detect proper placement of the activity monitoring device 120.

Figure 7C:
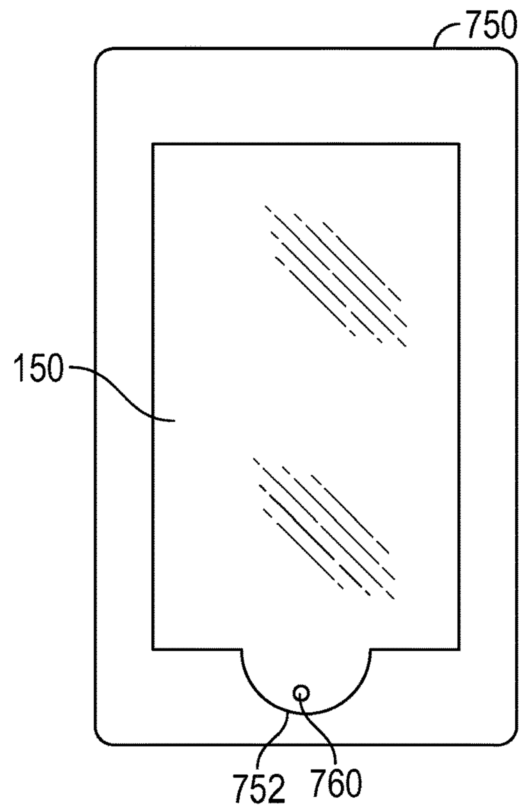

FIG. 7C illustrates the data processing device 150 partly covered by a case 750 that can assist with coupling of the activity monitoring device 120 to the data processing device 150. The case 750 can include a groove 752 (or a slot or cutout) for snuggly positioning and supporting the activity monitoring device 120 by the data processing device 150. The groove 752 can help with passing vibrations or motions of the data processing device 150 to the activity monitoring device 120 when the activity monitoring device 120 is positioned and supported by the groove 752. The groove 752 can be on an opposite side of the data processing device 150 from the display 410 and positioned so that the activity monitoring device 120 partly or entirely covers a microphone 760 when the activity monitoring device 120 is positioned properly against the data processing device 150. The microphone 760 can additionally or alternatively be used to detect proper placement of the activity monitoring device 120.

Figure 8A:
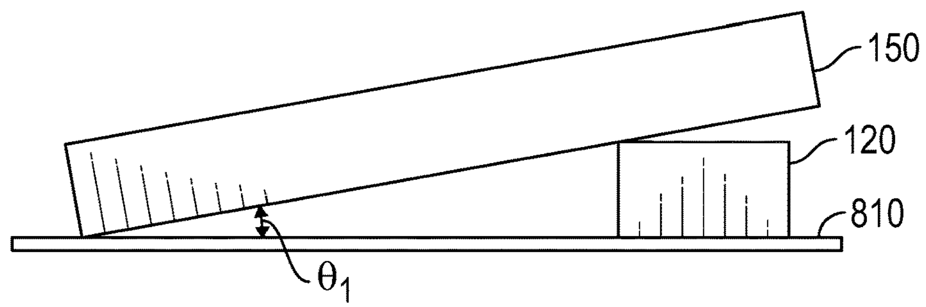
FIG. 8A illustrates the data processing device of FIG. 1B positioned to initiate communication with the activity monitoring device of FIG. 1A.

FIG. 8A illustrates the data processing device 150 positioned to communicate with the activity monitoring device 120. As shown in FIG. 8A, the data processing device 150 can be set on the activity monitoring device 120 so that one end of the data processing device 150 rests on the activity monitoring device 120 and an opposite end rests on a flat surface 810. The data processing device 150 can then detect an angle $\theta_1$ between the flat surface 810 and a bottom surface of the data processing device 150. Because the angle $\theta_1$ can be indicative of a number of the activity monitoring device 120 that are positioned beneath the one end of the data processing device 150, the data processing device 150 can detect the angle $\theta_1$ and accordingly determine to register for communication with just one of the activity monitoring device 120, such as using the process 300 of FIG. 3.

Figure 8B:
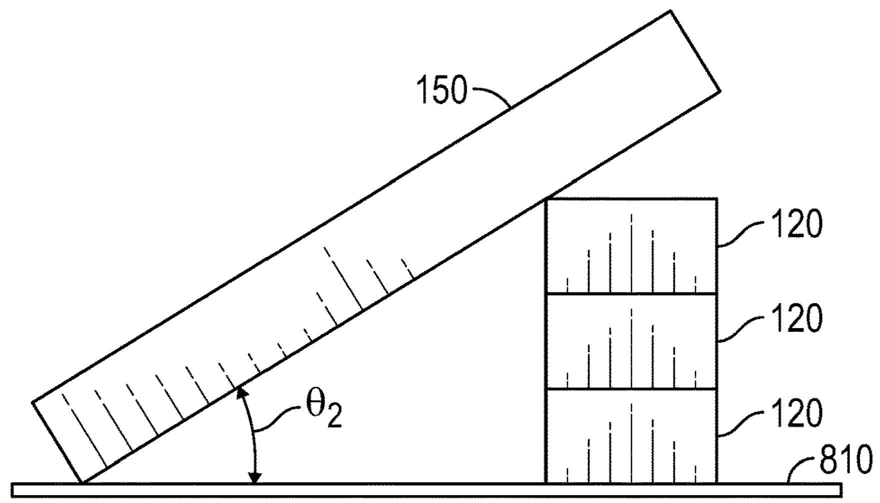
FIG. 8B illustrates the data processing device of FIG. 1B positioned to initiate communication with multiple of the activity monitoring device of FIG. 1A.

FIG. 8B illustrates the data processing device 150 positioned to communicate with multiple of the activity monitoring device 120. As shown in FIG. 8B, the data processing device 150 can be set on three of the activity monitoring device 120 so that one end of the data processing device 150 rests on the three of the activity monitoring device 120 and an opposite end rests on the flat surface 810. The data processing device 150 can then detect an angle $\theta_2$ between the flat surface 810 and the bottom surface of the data processing device 150. Because the angle $\theta_2$ can be indicative of a number of the activity monitoring device 120 that are positioned beneath the one end of the data processing device 150, the data processing device 150 can detect the angle $\theta_2$ and accordingly determine to register for communication with three of the activity monitoring device 120, such as using the process 300 of FIG. 3.

Figure 9:
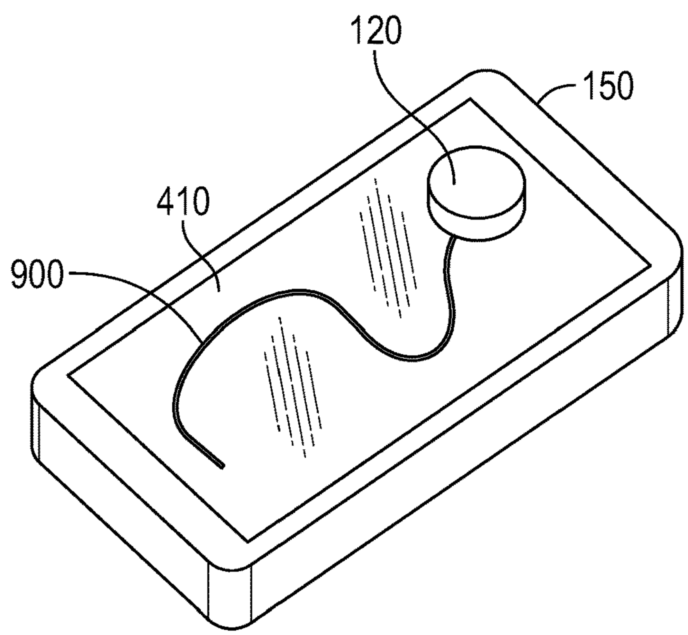
FIG. 9 illustrates the activity monitoring device of FIG. 1A interacting with the data processing device of FIG. 1B.

FIG. 9 illustrates the activity monitoring device 120 interacting with the data processing device 150. As can be seen from FIG. 9, the activity monitoring device 120 can be moved along a path 900 across the display 410. The activity monitoring device 120 may have a conductive or dielectric material on its surface that contacts the display 410 so that the touch-sensitive detection of the display 410 can determine path data indicative of the path 900 traveled by the activity monitoring device 120 across the display 410. The activity monitoring device 120 can use its gathered motion data (such as, from an accelerometer) to determine position data indicative of the path 900 traveled by the activity monitoring device 120 across the display 410 (for instance, by double-integrating the gathered motion data to convert acceleration data into position data). One or both of the activity monitoring device 120 and the data processing device 150 can collect and compare (for instance, from a measure of similarity like a cross-correlation) the path data and the position data to validate the connection of the activity monitoring device 120 and the data processing device 150.

Figure 10A:
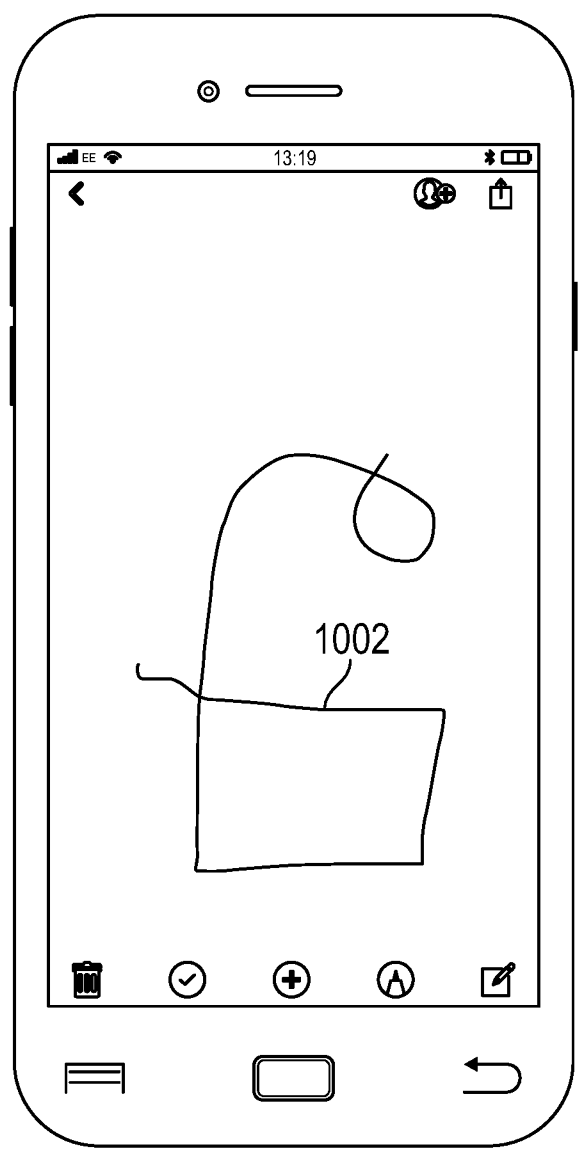
FIGS. 10A and 10B illustrate example data gathered by the activity monitoring device of FIG. 1A and the data processing device of FIG. 1B during an interaction of the activity monitoring device and the data processing device.
Figure 10B:
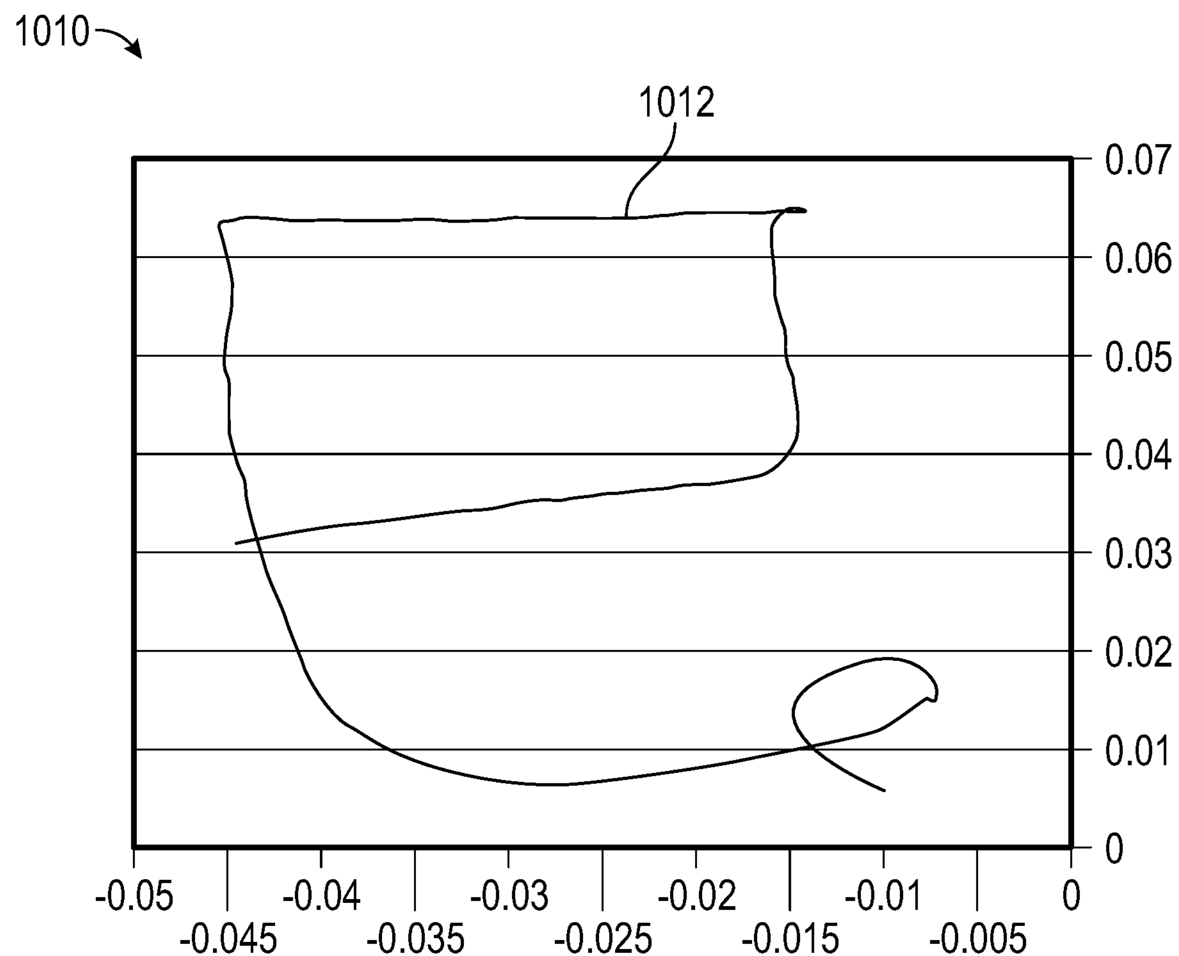

As one example of the path data and the position data of the preceding paragraph, FIG. 10A illustrates a display 1000 of path data 1002 gathered by the data processing device 150, and FIG. 10B illustrates a display 1010 of position data 1012 gathered by the activity monitoring device 120. The path data 1002 and the position data 1012 appear relatively similar and can have a relatively high degree of similarity (such as, in excess of a threshold metric of similarity).

Figure 11:
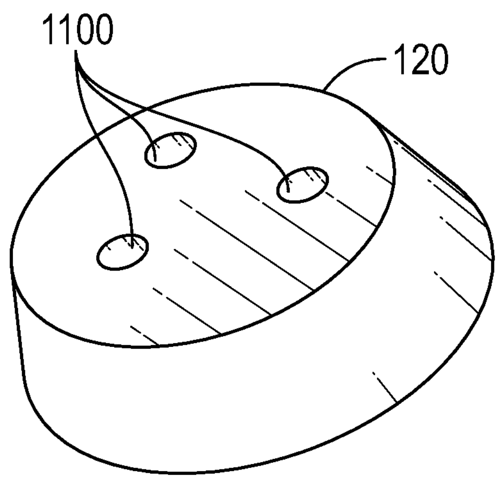
FIG. 11 illustrates example conductive or dielectric portions of the activity monitoring device of FIG. 1A.

FIG. 11 illustrates conductive or dielectric portions 1100 of the activity monitoring device 120 according to some aspects. A size/shape of the each of the conductive or dielectric portions 1100 or a spacing between the conductive or dielectric portions 1100 can be sufficiently unique to distinguish the activity monitoring device 120 from one or more other devices, such as another of the activity monitoring device 120 or another device with a conductive or dielectric material.

The conductive or dielectric portions 1100 can be positioned against and moved along the display 410. The touch-sensitive detection of the display 410 can in turn detect the conductive or dielectric portions 1100 and thus a path of each of the individual one of the conductive or dielectric portions 1100. The conductive or dielectric portions 1100 can provide a distinctive device signature, which can be detected by the data processing device 150 and usable to confirm that a device having the distinctive device signature contacted the display 410.

Figure 12A:
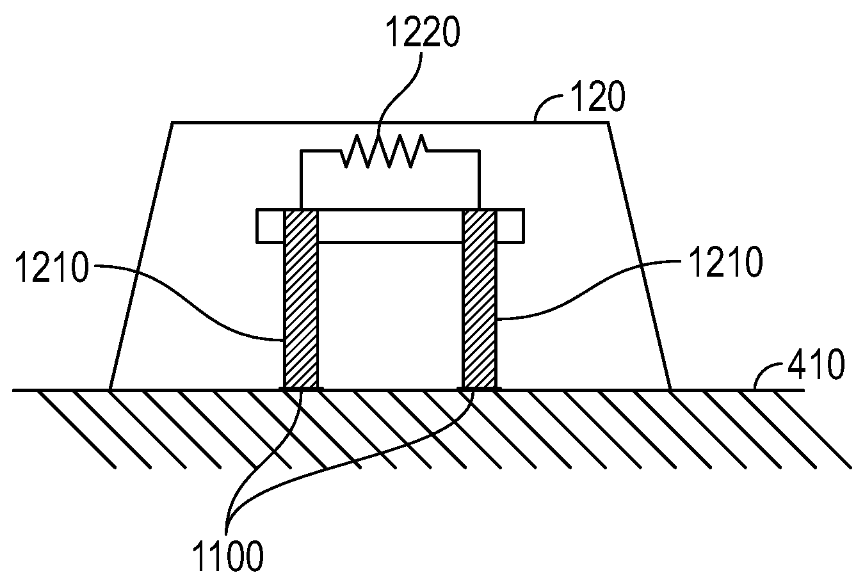
FIGS. 12A and 12B illustrate example resistance setting for conductive or dielectric portions of the activity monitoring device of FIG. 1A.
Figure 12B:
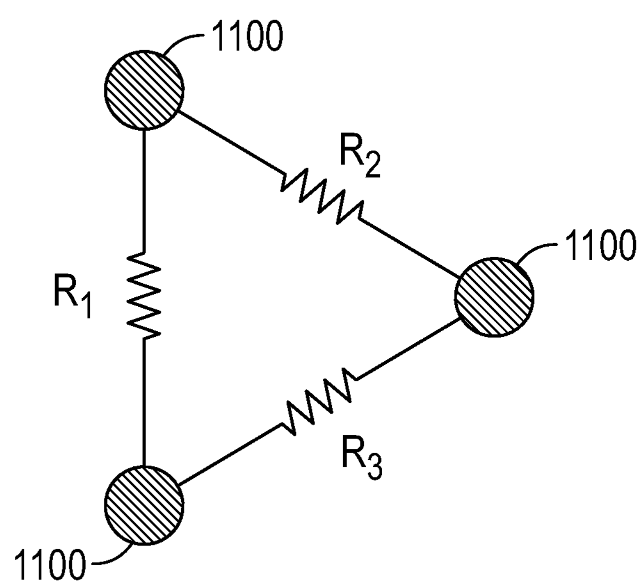

FIGS. 12A and 12B illustrate approaches for controlling resistances between the conductive or dielectric portions 1100. As can be seen in FIG. 12A, conductive materials 1210 can extend from the conductive or dielectric portions 1100 within the activity monitoring device 120. Each of the conductive materials 1210 can be coupled on opposite ends of the conductive or dielectric portions 1100 to each of the other of the conductive materials 1210 via a resistance, such as a resistor 1220. As shown in FIG. 12B, each of the conductive or dielectric portions 1100 can, for instance, be electrically coupled to the other two of the conductive or dielectric portions 1100. Two of the conductive or dielectric portions 1100 can be coupled via a resistor $R_1$, another two of the conductive or dielectric portions 1100 can be coupled via a resistor $R_2$, and yet another two of the conductive or dielectric portions 1100 can be coupled via a resistor $R_3$. The resistances or the ratio of resistances of the resistors $R_1$, $R_2$, and $R_3$ can further be set or varied to provide a distinctive device signature detectable by the touch-sensitive detection of the display 410. In one example, the ratio of the resistances of the resistors $R_1$, $R_2$, and $R_3$ can respectively be 1:5:9.

ADDITIONAL EXAMPLES

In some aspects, a method is disclosed where the method includes: preventing processing, by a first electronic device, of a command received from a second electronic device via a communication interface of the first electronic device; facilitating, by the second electronic device, a motion of the first electronic device in a motion sequence; detecting, by the first electronic device, the motion of the first electronic device in the motion sequence; and in response to said detecting, enabling processing, by the first electronic device, of the command received from the second electronic device via the communication interface.

The method of the preceding paragraph can include one or more of the following features: The method can include: monitoring, by the first electronic device, activity data for a user from the motion of the first electronic device when the first electronic device is supported by the user; and subsequent to said enabling processing, outputting, via the communication interface, the activity data to the second electronic device. The facilitating can include presenting, by a display of the second electronic device, instructions to a user for moving the first electronic device in the motion sequence. The facilitating can include moving the second electronic device in a way that physically moves the first electronic device in the motion sequence. The detecting can be performed using an accelerometer. The enabling processing can include pairing the first electronic device and the second electronic device. The method can include determining, by the second electronic device, that the first electronic device is proximate to the second electronic device, and the determining can be performed using an output of a light sensor, a microphone, or a touch sensor of the second electronic device. The method can include: covering at least part of the second electronic device with a case, the case comprising a slot or a groove; and supporting the first electronic device with the slot or the groove. The method can include activating an indicator of the first electronic device in response to the enabling processing. The motion sequence can include a pairing initiation sequence and an authentication sequence. The motion sequence can include a series of turns or vibrations of the first electronic device. The second electronic device can include a smart phone or a tablet computer. The method can include receiving, by the first electronic device, the command according to a Bluetooth™ Low Energy protocol via the communication interface.

In some aspects, an apparatus is disclosed where the apparatus includes: a housing; a motion sensor supported by the housing and configured to monitor a motion of the housing; a communication interface configured to wirelessly communicate with an electronic device; and a controller supported by the housing. The controller is configured to: prevent processing of a command received from the electronic device via the communication interface until a motion sequence by the housing is detected; detect the motion sequence from the motion of the housing; and responsive to detection of the motion sequence, enable processing of the command received from the electronic device via the communication interface.

The apparatus of the preceding paragraph can include one or more of the following features: The motion sequence can include a pairing initiation sequence and an authentication sequence. The controller can transmit one or more values to the electronic device via the communication interface, the one or more values being indicative of detection of the motion sequence. The controller can enable processing of the command by pairing with the electronic device. The housing can be attached to a user, and the controller can determine an activity parameter for the user from the motion of the housing. The controller can detect a disconnect sequence from the motion of the housing and, in response to detection of the disconnect sequence, prevent processing of the command received from the electronic device via the communication interface until the motion sequence is detected. The motion sequence can be programmed at device manufacture. The motion sequence can include a series of vibrations of the housing caused by vibrations of the electronic device. The motion sequence can include a series of turns of the housing. The housing can be shaped to fit in a slot or a groove on the electronic device. The housing can be at least partly covered by a conductive material or a dielectric material.

In some aspects, a method is disclosed where the method includes: facilitating, by a first electronic device, motion of a second electronic device in a motion sequence; detecting, by the second electronic device, motion of the second electronic device in the motion sequence; determining, by the second electronic device, a key from the motion sequence from said detecting, the key being usable to communicate with the first electronic device; and wirelessly communicating, by a communication interface of the second electronic device, with the first electronic device using the key.

The method of the preceding paragraph can include one or more of the following features: The method can include: monitoring, by the first electronic device, activity data for a user from motion of the second electronic device when the second electronic device is supported by the user, and the wirelessly communicating can include outputting, via the communication interface, the activity data to the first electronic device. The facilitating can include presenting, by a display of the first electronic device, instructions to a user for moving the second electronic device in the motion sequence. The facilitating can include moving the first electronic device in a way that physically moves the second electronic device in the motion sequence. The detecting can be performed using an accelerometer. The method can include pairing the second electronic device with the first electronic device using the key. The method can include activating an indicator of the second electronic device in response to said pairing. The method can include determining, by the first electronic device, that the second electronic device is proximate to the first electronic device, and the determining can be performed using an output of a light sensor, a microphone, or a touch sensor of the first electronic device. The method can include: covering at least part of the first electronic device with a case, the case including a slot or a groove; and supporting the second electronic device with the slot or the groove. The motion sequence can include a series of turns or vibrations of the second electronic device. The determining the key can include decoding the key from the series of turns or vibrations. The first electronic device can include a smart phone or a tablet computer. The wirelessly communicating can be performed according to a Bluetooth™ Low Energy protocol.

In some aspects, the apparatus can include: a housing; a motion sensor supported by the housing and configured to monitor motion of the housing; a communication interface configured to wirelessly communicate with an electronic device; and a controller supported by the housing. The controller can: detect a motion sequence from motion of the housing, determine a key from the motion sequence, and communicate with the electronic device via the communication interface using the key.

The apparatus of the preceding paragraph can include one or more of the following features: The controller can pair with the electronic device using the key. The housing can be attached to a user, and the controller can determine an activity parameter for the user from motion of the housing. The motion sequence can be programmed at device manufacture. The motion sequence can include a series of vibrations or turns of the housing. The controller can determine the key by decoding the motion sequence from the series of vibrations or turns of the housing. The housing can be shaped to fit in a slot or a groove on the electronic device. The housing can include a plurality of pads including a conductive material or a dielectric material. The apparatus can further include: a first resistance in the housing that is electrically coupled between a first pad of the plurality of pads and a second pad of the plurality of pads, and a second resistance in the housing that is electrically coupled between the first pad and a third pad of the plurality of pads, the second resistance being different from the first resistance. A ratio of the first resistance to the second resistance can be at least 2:1. The apparatus can include the electronic device, and the electronic device can distinguish the housing from another device by detecting the first resistance and the second resistance, the another device including the conductive material or the dielectric material.

Other Variations and Terminology

Although some examples herein may describe connecting electronics device using an out-of-band communication, the examples can similarly apply to disconnecting electronic devices using an out-of-band communication. For instance, an electronic device may detect that it has been moved in a motion sequence corresponding to an unpairing instruction and may accordingly unpair with one or more other devices.

Any value of a threshold, limit, duration, etc. provided herein is not intended to be absolute and, thereby, can be approximate. In addition, any threshold, limit, duration, etc. provided herein can be fixed or varied either automatically or by a user. Furthermore, as is used herein relative terminology such as exceeds, greater than, less than, etc. in relation to a reference value is intended to also encompass being equal to the reference value. For example, exceeding a reference value that is positive can encompass being equal to or greater than the reference value. In addition, as is used herein relative terminology such as exceeds, greater than, less than, etc. in relation to a reference value is intended to also encompass an inverse of the disclosed relationship, such as below, less than, greater than, etc. in relations to the reference value. Moreover, although blocks of the various processes may be described in terms of determining whether a value meets or does not meet a particular threshold, the blocks can be similarly understood, for example, in terms of a value (i) being below or above a threshold or (ii) satisfying or not satisfying a threshold.

Features, materials, characteristics, or groups described in conjunction with a particular aspect, embodiment, or example are to be understood to be applicable to any other aspect, embodiment or example described herein unless incompatible therewith. All of the features disclosed in this specification (including any accompanying claims, abstract and drawings), or all of the steps of any method or process so disclosed, may be combined in any combination, except combinations where at least some of such features or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

While certain embodiments have been described, these embodiments have been presented by way of example only, and are not intended to limit the scope of protection. Indeed, the novel methods and systems described herein may be embodied in a variety of other forms. Furthermore, various omissions, substitutions and changes in the form of the methods and systems described herein may be made. Those skilled in the art will appreciate that in some embodiments, the actual steps taken in the processes illustrated or disclosed may differ from those shown in the figures. Depending on the embodiment, certain of the steps described above may be removed, others may be added. For example, the actual steps or order of steps taken in the disclosed processes may differ from those shown in the figure. Depending on the embodiment, certain of the steps described above may be removed, others may be added. For instance, the various components illustrated in the figures may be implemented as software or firmware on a processor, controller, ASIC, FPGA, or dedicated hardware. Hardware components, such as controllers, processors, ASICs, FPGAs, and the like, can include logic circuitry. Furthermore, the features and attributes of the specific embodiments disclosed above may be combined in different ways to form additional embodiments, all of which fall within the scope of the present disclosure.

Although the present disclosure includes certain embodiments, examples and applications, it will be understood by those skilled in the art that the present disclosure extends beyond the specifically disclosed embodiments to other alternative embodiments or uses and obvious modifications and equivalents thereof, including embodiments which do not provide all of the features and advantages set forth herein. Accordingly, the scope of the present disclosure is not intended to be limited by the specific disclosures of preferred embodiments herein, and may be defined by claims as presented herein or as presented in the future.

Conditional language, such as "can," "could," "might," or "may," unless specifically stated otherwise, or otherwise understood within the context as used, is generally intended to convey that certain embodiments include, while other embodiments do not include, certain features, elements, or steps. Thus, such conditional language is not generally intended to imply that features, elements, or steps are in any way required for one or more embodiments or that one or more embodiments necessarily include logic for deciding, with or without user input or prompting, whether these features, elements, or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Further, the term "each," as used herein, in addition to having its ordinary meaning, can mean any subset of a set of elements to which the term "each" is applied.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, or 0.1 degree.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

What is claimed is:

1. A method for facilitating wireless communication between two electronic devices, the method comprising:

generating, by a first electronic device, first data responsive to a first motion of the first electronic device, the first motion comprising movement of the first electronic device proximate or against a user interface of a second electronic device;

generating, by the second electronic device, second data responsive to the first motion of the first electronic device;

transmitting the first data or the second data between the first electronic device and the second electronic device;

comparing, by the first electronic device or the second electronic device, the first data and the second data;

enabling wireless communication between the first electronic device and the second electronic device responsive to a result of said comparing the first data and the second data;

generating, by the first electronic device, activity data for a user from a second motion of the first electronic device when the first electronic device is worn by the user, wherein at least some of the activity data represents loading of a limb of the user; and subsequent to said enabling wireless communication between the first electronic device and the second electronic device, wirelessly communicating, by the first electronic device, the activity data to the second electronic device.

2. The method of claim 1, wherein said comparing the first data and the second data is performed by the first electronic device.

3. The method of claim 1, wherein said comparing the first data and the second data is performed by the second electronic device.

4. The method of claim 1, wherein said generating the first data comprises generating the first data from data output by an accelerometer, and said generating the second data comprises generating the second data from data output by a touch sensor.

5. The method of claim 4, wherein said comparing the first data and the second data comprises determining a cross-correlation between the first data and the second data.

6. The method of claim 1, wherein said enabling wireless communication between the first electronic device and the second electronic device comprises validating a connection between the first electronic device and the second electronic device.

7. The method of claim 1, wherein said enabling wireless communication between the first electronic device and the second electronic device comprises authenticating wireless communication between the first electronic device and the second electronic device.

8. The method of claim 1, wherein said generating the activity data is performed while the first electronic device is attached to the limb or an orthopedic device worn by the user.

9. The method of claim 1, wherein the first motion comprises movement of the first electronic device along a path against the user interface of the second electronic device.

10. A system comprising:

a first electronic device comprising:

a housing;

a motion sensor supported by the housing and configured to monitor motion of the first electronic device, wherein the motion sensor is configured to generate first data responsive to a first motion of the first electronic device, the first motion comprising movement of the first electronic device against a user interface of a second electronic device, wherein the motion sensor is configured to generate activity data for a user from a second motion of the first electronic device when the housing is worn by the user, and wherein at least some of the activity data represents loading of a limb of the user;

a communication interface supported by the housing and configured to wirelessly communicate with the second electronic device; and one or more controllers supported by the housing and configured to:

enable wireless communication between the first electronic device and the second electronic device responsive to a result of a comparison of the first data and second data, wherein the second data is generated responsive to the first motion of the first electronic device, and wherein the first data or the second data is transmitted between the first electronic device and the second electronic device, and communicate the activity data to the second electronic device via the communication interface.

11. The system of claim 10, wherein the motion sensor comprises an accelerometer or a gyroscope.

12. The system of claim 10, wherein the one or more controllers are configured to enable wireless communication between the first electronic device and the second electronic device responsive to the comparison of the first data and the second data indicating at least a threshold degree of similarity between the first data and the second data.

13. The system of claim 10, wherein the one or more controllers are configured to compare the first data and the second data.

14. The system of claim 13, wherein the one or more controllers are configured to determine a cross-correlation between the first data and the second data to compare the first data and the second data.

15. The system of claim 10, further comprising the second electronic device, the second electronic device being configured to compare the first data and the second data.

16. The system of claim 10, further comprising the second electronic device, the second electronic device being configured to generate the second data from data output by a touch sensor.

17. The system of claim 10, wherein the one or more controllers are configured to enable wireless communication between the first electronic device and the second electronic device by validating a connection between the first electronic device and the second electronic device.

18. The system of claim 10, wherein the one or more controllers are configured to enable wireless communication between the first electronic device and the second electronic device by authenticating wireless communication between the first electronic device and the second electronic device.

19. The system of claim 10, wherein the limb comprises a foot.

20. The system of claim 10, wherein the first motion comprises movement of the first electronic device along a path against the user interface of the second electronic device.

* * * * *